United States Patent

Plant, Jr.

[15] 3,637,251
[45] Jan. 25, 1972

[54] OVERCAB BED FOR MOBILE CAMPERS

[72] Inventor: John D. Plant, Jr., Branford, Conn. 06405

[22] Filed: Aug. 17, 1970

[21] Appl. No.: 64,489

[52] U.S. Cl. .................................................. 296/23 R
[51] Int. Cl. ........................................................ B60p 3/34
[58] Field of Search .................................. 296/23, 23 MC

[56] References Cited

UNITED STATES PATENTS

| 3,469,881 | 9/1969 | McNamee | 296/23 MC |
| 3,160,435 | 12/1964 | Smith | 296/23 |

*Primary Examiner*—Philip Goodman
*Attorney*—Hunt, Heard & Rhodes

[57] ABSTRACT

An overcab bed in a camper vehicle of the type comprising a camper body combined with a panel truck, wherein the bed includes a platform having a slidable portion to provide access to the cab portion during nonsleeping hours.

4 Claims, 4 Drawing Figures

PATENTED JAN 25 1972
3,637,251
SHEET 1 OF 2
FIG. 1
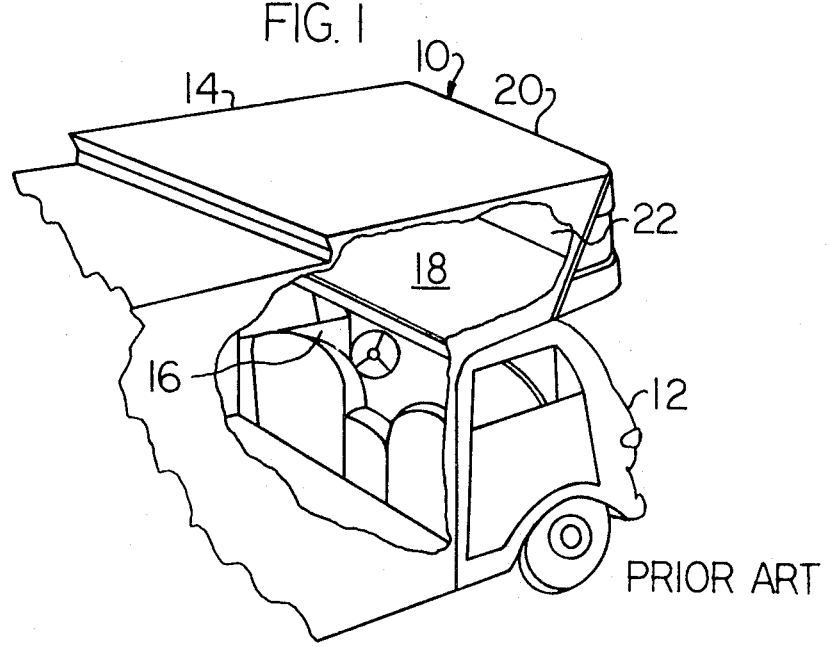
PRIOR ART
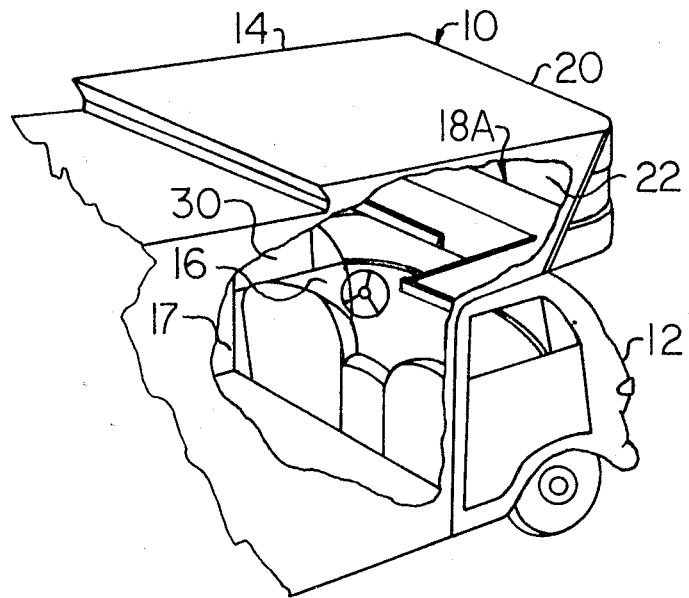
FIG. 2
INVENTOR
JOHN D. PLANT, JR.
BY
Hunt, Heard & Rhodes

INVENTOR
JOHN D. PLANT, JR.

OVERCAB BED FOR MOBILE CAMPERS

BACKGROUND OF THE INVENTION

The recent trend toward family camping trips has given stimulus to a whole industry of camping and recreational equipment to provide for the needs and comfort of campers as they venture into the outdoors further from their homes and the conventional lodging and eating facilities. A variety of mobile recreational vehicles ranging from the family car equipped with tents and sleeping bags to the conventional pickup truck with a camper body affixed upon its shallow open bed. More recently larger campers have been designed by cutting down a panel truck and building a camper body thereon to furnish a full complement of living quarter facilities.

In such campers, an overcab bed platform replaces the conventional ceiling in the cab, while the space behind the seats in the cab open into the living quarters. However, the arrangement of the overcab platform makes movement of adults from the living quarters into the cab and vice versa extremely difficult, if not practically impossible, so that the benefits of the cab access are not fully realized.

SUMMARY OF THE INVENTION

The present invention, on the other hand, facilitates movement between the two compartments by providing a convertible, overcab bed platform utilizing a sliding panel. When the panel is in its stored or retracted position, walk-through access is possible between the compartments, yet the platform assembly converts to an overcab bed by sliding the panel to its opened or sleeping position.

It is therefore an object of the present invention to provide a van-type camper with walk-through access between the cab and the living quarters.

It is another object of this invention to provide a convertible overcab bed platform in a van-type camper including a platform having a slidable panel, enabling the platform assembly to be retracted above the cab seats by moving the sliding panel to a day position and permitting its conversion into a double bed for night use by opening the panel to its sleeping position.

Some of the objects of the invention having been stated, other objects will appear as the description proceeds, when taken in connection with the accompanying drawings, in which:

FIG. 1 is a perspective view, with parts broken away, of a van-type camper illustrating a conventional overcab bed platform of the type known previously;

FIG. 2 is a perspective view similar to FIG. 1 except illustrating an overcab bed platform assembly constructed in accordance with the present invention, with the sliding panel in the retracted day position;

Figure 3:
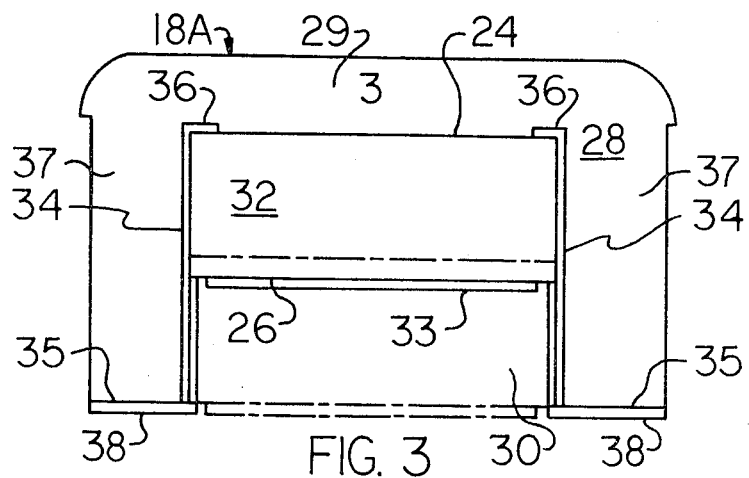
FIG. 3 is a plan view of the overcab bed platform assembly illustrating in solid lines the sliding panel in the day position and in dotted lines the panel in the opened, sleeping position.

Turning now to the drawings, and FIG. 1 in particular, a van-type camper 10 (hereinafter referred to as "mobile camper") includes a panel truck 12 having its roof and rear body portion cut away to accommodate a camper body 14. The camper body 14 encloses the rear of the chassis and covers the ceiling of the cab forming an enclosure defining living quarters 17. The ceiling in the driver's compartment 16 is replaced with sleeping platform 18, forming with enclosure 20, a forwardly projecting elevated sleeping compartment 22.

Figure 4:
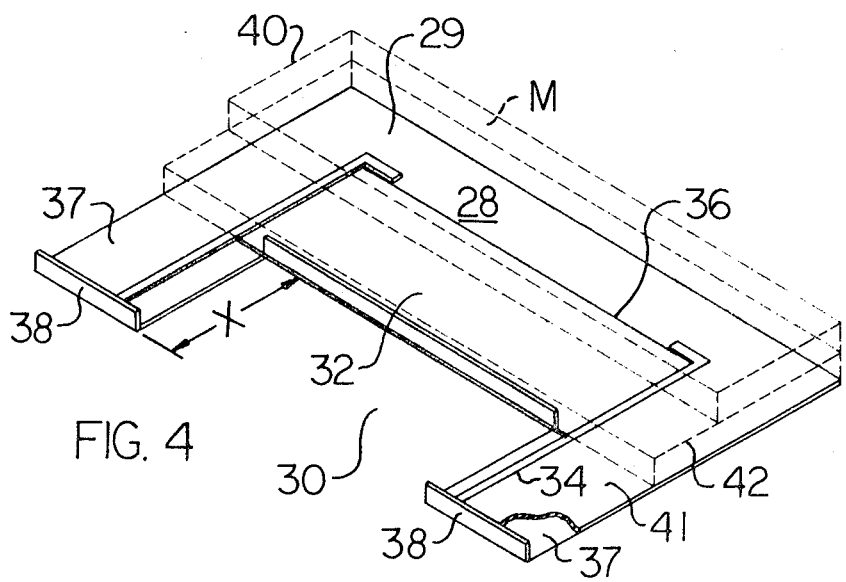
FIG. 4 is a perspective view of the overcab platform assembly, illustrating the sliding panel in retracted position with the sectional mattress, in broken lines, stored atop thereof.

In the present invention, a platform 18 is replaced with platform assembly 18A, see FIGS. 2 and 4, comprising generally a U-shaped overcab bed platform 28, guides 34, and a sliding panel 32. Platform 28 includes a pair of side members 37 abutting against the sidewalls of the camper body and extending out over a portion of the driver's and passenger's seats. A front web 29 joins the front ends of side members 37 and extends partially over the cab area, so that platform 28 covers the side and front portions of the cab, however an opening 30 behind web 29 and between sides 37 permits walk-in access between the driver's compartment 16 and living quarters 17. For the purpose of preventing lateral movement of sliding panel 32, a pair of guides 34 extend along the inner edges of sides 37 on opposite sides of opening 30 from the rear edge 35 of platform 28 toward the front thereof a distance equal to approximately twice the depth of opening 30, and terminate in inturned flanges or stops 36. An upturned flange 38, if desired, may be mounted to the rear edge 35 of side members 37 to serve as a side board therefor.

A sliding panel 32, slightly longer than the distance between side members 37 and approximately equal in width to the depth of opening 30, is slidably mounted between guides 34 for movement between a day or storage position shown in solid lines in FIG. 2, with forward edge 24 resting against stops 36 whereby opening 30 is uncovered for access to the cab, and a sleeping or night position shown in broken lines, with rearward edge 26 resting against flanges 38 whereby opening 30 is covered. If desired, an upturned flange 33 mounted to the rear edge 26 of panel 32 registers with the flange 38 of platform 28, forming a continuous side board across the rear of platform assembly 18A when panel 32 is in the night position.

Guides 34 and stops 36 are preferably flat, having a thickness substantially equal to that of panel 32 and are spaced slightly from the edges of sides 37 and web 29 to provide a support for sliding panel 32. Additionally, the outer surfaces of sides 37 and front web 29 can be provided with a suitable pad 41 of the same thickness as guides 34, thereby providing a substantially uniform, flat sleeping surface atop platform assembly 18A.

Panel 32 may be secured in either position by any suitable means such as, for example, latches or drop pins (not shown) to prevent inadvertent shifting of the panel when mobile camper 10 is in motion.

A sectional mattress M, FIG. 4, is stored above platform assembly 18A and is preferably formed of two sections facilitating the storage. A first section 40 includes a width dimension at least equal to the depth dimension $x$ of opening 30, while the width of second section 42 is such that when used with section 40, it will cover the remainder of platform assembly 18A. When not in use, section 40 is stacked toward the front of sleeping compartment 22 on top of section 42 so as not to obstruct opening 30 while panel 32 is in the stored position.

In the drawings and specification there have been set forth preferred embodiments of the invention, and although specific terms are employed, they are used in a generic and descriptive sense only, and not for purposes of limitation, the scope of the invention being defined in the following claims.

What is claimed is:

1. In a mobile camper of the type including a panel truck having a major portion of the roof and side panels cut away to accommodate a camper body superimposed thereupon and attached to said panel truck, said camper body having an extension projecting forwardly over the cab of said truck and a platform extending over said cab forming a sleeping compartment in said extension above the cab, the improvement comprising a medial opening in said platform above a portion of said cab for providing walk-in access between said cab and the interior of said camper body, and a panel slidably attached to said platform and movable between a first storage position uncovering said opening and a second sleeping position covering said opening.

2. The camper according to claim 1 wherein said platform includes a pair of side members and a frontal web extending between the front ends of said side members forming a U-shaped stationary platform with a medial opening therein, said platform further including a means for defining the path of movement of said sliding panel.

3. The camper according to claim 2 wherein said means comprises a rail attached to said platform surrounding said opening, said rail being spaced slightly from the edges of said side members and web to form a ledge supporting said slidable panel.

4. The camper according to claim 3 wherein said rail is flat and extends above the surface of said platform a distance approximately equal to the thickness of said panel.

* * * * *